United States Patent
Yamami et al.

(10) Patent No.: US 10,358,160 B2
(45) Date of Patent: Jul. 23, 2019

(54) STEERING WHEEL

(71) Applicant: NIHON PLAST CO., LTD., Shizuoka (JP)

(72) Inventors: Akihiko Yamami, Guangdong (CN); Yohei Kiuchi, Shizuoka (JP); Takuya Ohki, Shizuoka (JP); Takashi Mitobe, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 16/020,978

(22) Filed: Jun. 27, 2018

(65) Prior Publication Data
US 2019/0002009 A1 Jan. 3, 2019

(30) Foreign Application Priority Data

Jun. 30, 2017 (JP) .................. 2017-128428

(51) Int. Cl.
*B62D 1/04* (2006.01)
*B62D 1/06* (2006.01)
(52) U.S. Cl.
CPC .................... *B62D 1/06* (2013.01)
(58) Field of Classification Search
CPC ............ B62D 1/04; B62D 1/06; B62D 1/065
See application file for complete search history.

(56) References Cited

U.S. PATENT DOCUMENTS

| 4,547,655 | A  | * | 10/1985 | Kurata ................... | B62D 1/065 219/204 |
|---|---|---|---|---|---|
| 6,365,875 | B1 | * | 4/2002 | Kreuzer .................. | B62D 1/06 219/204 |
| 6,762,394 | B2 | * | 7/2004 | Hobby .................... | B62D 1/065 219/202 |
| 6,817,100 | B2 | * | 11/2004 | Mori ........................ | G05G 1/10 29/894.1 |
| 8,051,567 | B2 | * | 11/2011 | Kwon .................. | B29C 44/445 29/428 |
| 8,881,621 | B2 | * | 11/2014 | Bodebratt ................ | B62D 1/04 74/558 |
| 9,073,570 | B2 | * | 7/2015 | Krishnamoorthy ...... | B62D 1/04 |
| 9,610,967 | B2 | * | 4/2017 | Dean ........................ | B62D 1/06 |
| 2005/0269018 | A1 | * | 12/2005 | Haart ....................... | B62D 1/06 156/196 |
| 2014/0083239 | A1 | * | 3/2014 | Fujita ..................... | B62D 1/06 74/558 |
| 2017/0259840 | A1 | * | 9/2017 | Uematsu ................. | B62D 1/06 |
| 2018/0273078 | A1 | * | 9/2018 | Mitobe .................. | B62D 1/065 |
| 2019/0002008 | A1 | * | 1/2019 | Inaba ...................... | B62D 1/06 |

FOREIGN PATENT DOCUMENTS

JP 2013-139203 7/2013

\* cited by examiner

*Primary Examiner* — Adam D Rogers
(74) *Attorney, Agent, or Firm* — JCIPRNET

(57) ABSTRACT

Provided is a steering wheel which includes a spacer (19) having a first base portion (32) and a second base portion (33) which are respectively disposed on a front side and a rear side with a rim metal core portion (28) interposed therebetween and are engaged with each other to cover the rim metal core portion (28), in which the first base portion (32) and the second base portion (33) are each divided into a plurality of portions at positions different from each other in a circumferential direction of the rim metal core portion (28).

3 Claims, 4 Drawing Sheets

STEERING WHEEL

CROSS REFERENCE TO RELATED APPLICATION

This application is entitled to the benefit of Japanese Patent Application No. 2017-128428 filed on Jun. 30, 2017, the disclosure of which including the specification, drawings and abstract is incorporated herein by reference in its entirety.

BACKGROUND

Technical Field

The disclosure relates to a steering wheel including a grip portion which is gripped and operated by an occupant.

Description of Related Art

In recent years, as part of efforts to preserve the global environment and to suppress generation of greenhouse gas emissions, electric vehicles (EV) with less environmental load to replace gasoline engine vehicles have become widespread.

Since an electric vehicle has a storage battery and a motor, and energy basically has to be supplemented from an external charger, measures to suppress consumption of stored power are indispensable. Particularly, it is most effective to suppress consumption of electric power for heating (air conditioning) that consumes a large amount of power.

Instead of air conditioners, electric vehicles in which a steering wheel with which an occupant (driver) is directly in contact transmits warmth directly to the occupant have been developed. Specifically, a configuration in which a heater wire is buried in a steering wheel as a heating element is known.

According to electric vehicles having such a steering wheel, by warming the steering wheel with a heater wire, it is possible to reduce power consumption of air conditioning while alleviating reluctance of operation and a feeling of discomfort even immediately after start-up when various constituent devices are not sufficiently warmed yet.

For example, Patent Literature 1 discloses, for example, a steering wheel including a spacer which is a tubular base part covering a rim metal core portion and a heater wire held by being hooked in a zigzag manner outside the spacer, in which the spacer is buried together with the heater wire in a resin layer formed of a synthetic resin raw material such as urethane.

Patent Literatures

[Patent Literature 1] Japanese Unexamined Patent Application Publication No. 2013-139203 (Pages 4 to 6, FIGS. 1 to 5)

The spacer of Patent Literature 1 is divided approximately in halves into an upper side portion disposed on an occupant side of the rim metal core portion and a lower side portion disposed on a side opposite thereto, in which the upper side portion and the lower side portion are engaged by claws or the like to be attached with the rim metal core portion interposed therebetween. In addition, the upper side portion and the lower side portion are each divided into a plurality of portions in a circumferential direction of the rim metal core portion. In such a spacer, it is preferable that the upper side portion and the lower side portion be more appropriately positioned.

SUMMARY

The disclosure provides a steering wheel capable of appropriately positioning divided base portions.

A steering wheel of the disclosure includes a grip portion for operation, a grip portion metal core of the grip portion, and a base portion including a first base portion and a second base portion which are engaged with each other with the grip portion metal core interposed therebetween and are fixed with each other while covering the grip portion metal core, in which the first base portion and the second base portion are each divided into a plurality of portions at positions different from each other in a circumferential direction of the grip portion metal core.

The steering wheel of the disclosure further includes a resin layer which covers the grip portion metal core and the base portion and constitutes at least a portion of the grip portion.

The steering wheel of the disclosure further includes an electronic component attached to the base portion.

DESCRIPTION OF THE EMBODIMENTS

Hereinafter, a configuration of one embodiment of the disclosure will be described with reference to the drawings.

According to the disclosure, positioning of the divided base portions can be appropriately performed.

Figure 5:
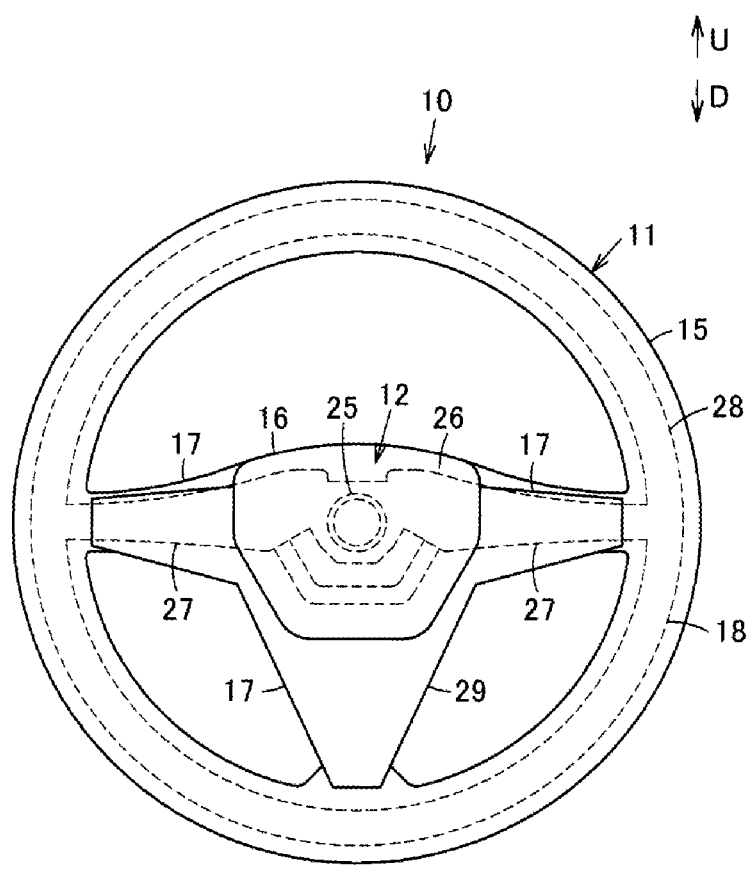
FIG. 5 is a front view of a steering wheel.

In FIG. 5, a steering wheel 10 is, for example, a steering wheel of an automobile as a vehicle. The steering wheel 10 includes a steering wheel main body 11 and an airbag device (airbag module) 12. The airbag device 12 is a center pad that is a pad body mounted on an occupant side of the steering wheel main body 11. The steering wheel 10 is mounted on a steering shaft (not illustrated) obliquely provided in the vehicle.

Figure 1A:
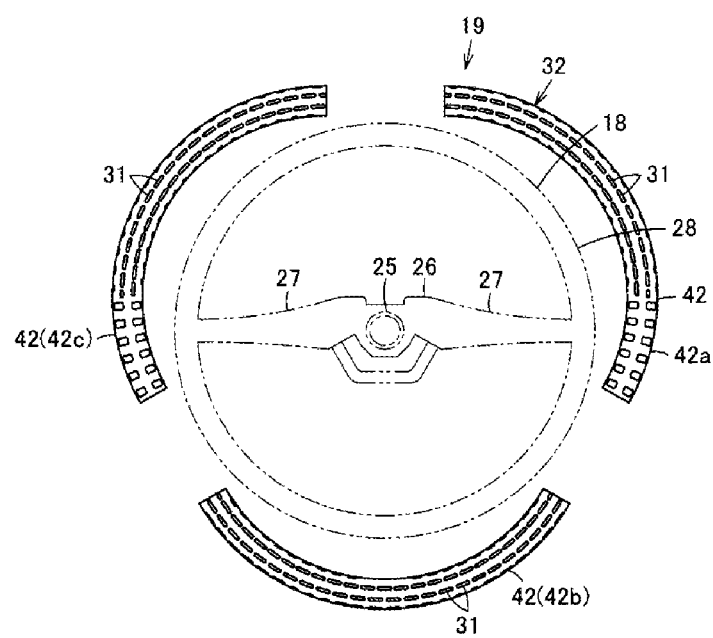
FIG. 1A is an exploded view from a front side illustrating a portion of a steering wheel of one embodiment of the disclosure.
Figure 1B:
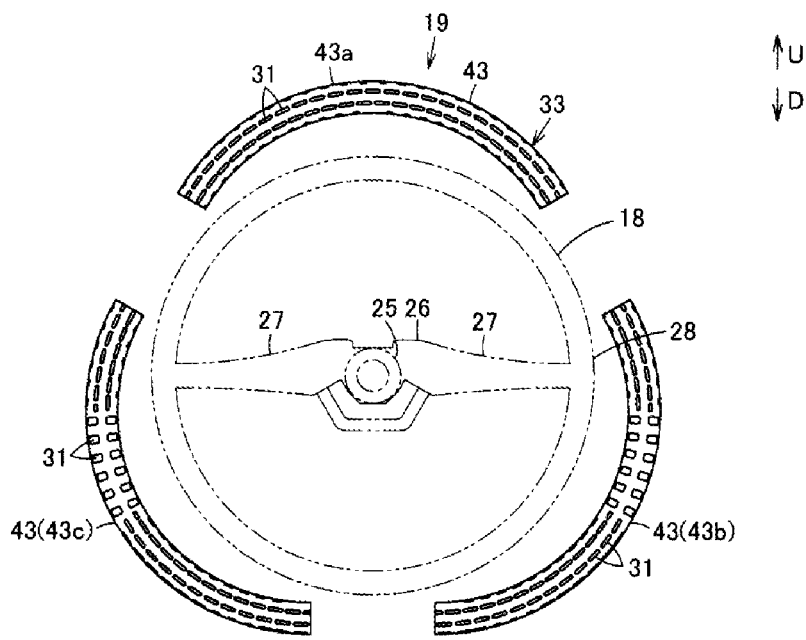
FIG. 1B is an exploded view from a rear side illustrating a portion of the steering wheel.

In the following description, the occupant side viewed from the steering wheel 10, that is, a front side of the steering wheel 10, is simply referred to as a front side. Also, the steering shaft side viewed from the steering wheel 10, that is, a rear side of the steering wheel 10, is simply referred to as a rear side. Therefore, in the following description, the front side represents a backward side of the vehicle and the rear side represents a forward side of the vehicle, that is, a windshield side. Further, an upper side of the steering wheel 10 is a direction of an arrow U in FIG. 1A, FIG. 1B, FIG.

3, and FIG. 5, and a lower side thereof is a direction of an arrow D in FIG. 1A, FIG. 1B, FIG. 3, and FIG. 5.

The steering wheel main body 11 includes a rim portion (grip portion) 15, a boss portion 16, a spoke portion 17, a metal core 18, a spacer 19, an electronic component 20, and a resin layer 23. The rim portion 15 is an operation grip portion of which at least a portion is formed along a circular arc. In the present embodiment, the rim portion 15 is formed in an annular shape (donut shape) as illustrated in FIG. 5. The boss portion 16 is disposed on an inner side of the rim portion 15. The spoke portion 17 connects the rim portion 15 to the boss portion 16. A plurality of spoke portions 17 are provided and three spoke portions 17 are provided in the present embodiment. The spacer 19 is an example of a base portion of the disclosure. Although not illustrated, the steering wheel main body 11 includes a cover body serving as a covering member. Further, the steering wheel main body 11 may include an epidermal portion covering the resin layer 23.

The metal core 18 is formed of, for example, a magnesium aluminum (MgAl) alloy, iron, or the like. The metal core 18 includes a boss 25 and a boss plate 26. The boss 25 is provided in a substantially circular shape on a rear side of the boss portion 16, and has a serration structure meshed with the steering shaft. The boss plate 26 is a core body of the metal core 18 and is integrally fixed to the boss 25. Spoke metal core portions 27 corresponding to the spoke portions 17 extend from the boss plate 26 integrally with the boss plate 26 or are fixed to the boss plate 26 by welding or the like. Further, a rim metal core portion 28 corresponding to the rim portion 15 is fixed to the spoke metal core portions 27 of the spoke portions 17 by welding or the like. The rim metal core portion 28 is an example of a grip portion metal core of the disclosure.

The spoke metal core portions 27 are provided radially. The spoke metal core portions 27 need not correspond to all the spoke portions 17, and some of the spoke portions 17 may not include the spoke metal core portion 27 but may be configured by a finisher 29 or the like. The finisher 29 is not an indispensable configuration.

The rim metal core portion 28 constitutes a portion of the rim portion 15. The rim metal core portion 28 is formed along a circular arc. In the present embodiment, the rim metal core portion 28 is formed in an annular shape, for example.

The spacer 19 allows the electronic component 20 to be disposed around the rim metal core portion 28 and holds the electronic component 20 to be kept at a constant distance from a surface of the rim portion 15 (see FIG. 5). The spacer 19 is also called a shell or the like. That is, the spacer 19 is disposed between the rim metal core portion 28 and the electronic component 20. The spacer 19 is formed of a synthetic resin such as polycarbonate or acrylonitrile butadiene styrene (ABS), for example. In addition, the spacer 19 is formed along a circular arc (in an annular shape) to cover the entire circumference of the rim metal core portion 28. Further, the spacer 19 is formed in a tubular shape. In the present embodiment, the spacer 19 is formed in a cylindrical shape.

Communication holes 31 are provided in the spacer 19. The spacer 19 includes a first base portion (upper side base portion) 32 and a second base portion (lower side base portion) 33. The first base portion 32 is disposed on the front side of the rim metal core portion 28 and the second base portion 33 is disposed on the rear side of the rim metal core portion 28, and they are engaged with each other. That is, the first base portion 32 and the second base portion 33 are assembled to the rim metal core portion 28 so that the rim metal core portion 28 is sandwiched from the front side and the rear side and a periphery of the rim metal core portion 28 is covered. That is, in a state in which the spacer 19 is assembled around the rim metal core portion 28, the rim metal core portion 28 is positioned inside the spacer 19. The spacer 19 is disposed to cover the rim metal core portion 28 at a position spaced apart from the rim metal core portion 28. That is, a space is formed between the spacer 19 and the rim metal core portion 28.

The communication holes 31 are portions through which a synthetic resin raw material in a liquid state passes at the time of molding the resin layer 23. This synthetic resin raw material is, for example, a reaction mixture liquid that reacts to become polyurethane. The communication holes 31 are provided to penetrate an outer peripheral surface of the spacer 19. A plurality of the communication holes 31 are provided. For example, the plurality of communication holes 31 are provided in a circumferential direction.

The first base portion 32 constitutes a front-side half of the spacer 19. The communication holes 31 are provided in the first base portion 32. The first base portion 32 is divided into a plurality of portions in the circumferential direction of the rim metal core portion 28. That is, the first base portion 32 includes a plurality of first base members 42 in the circumferential direction of the rim portion 15 (see FIG. 5), that is, in the circumferential direction of the rim metal core portion 28 (see FIG. 1A). In the present embodiment, three first base members 42 are provided, for example. That is, in the present embodiment, the first base members 42 are divided into a first base member 42a, a first base member 42b, and a first base member 42c.

In the present embodiment, the first base members 42a to 42c are, for example, set to have lengths equal to each other (including substantially equal lengths) in the circumferential direction, but may have lengths different from each other. In the present embodiment, the first base member 42a constitutes, for example, an upper right portion on the front side of the spacer 19 (a portion extending from 12 o'clock to 4:30 on an analog timepiece when viewed from the front side). The first base member 42b constitutes a lower portion on the front side of the spacer 19 (a portion extending from 4:30 to 7:30 on an analog timepiece when viewed from the front side). The first base member 42c constitutes an upper left portion on the front side of the spacer 19 (a portion extending from 7:30 to 12 o'clock on an analog timepiece when viewed from the front side) (see FIG. 1A). Therefore, the first base members 42a and 42c respectively cover portions of the rim metal core portion 28 extending from an upper side of the spoke metal core portions 27 and 27 to a lower side of the spoke metal core portions 27 and 27, and the first base member 42b covers a portion of the rim metal core portion 28 on a lower side of the spoke metal core portions 27 and 27. In addition, the first base members 42a and 42c are disposed to be bilaterally symmetric (including substantially bilaterally symmetric).

The second base portion 33 constitutes a remaining portion of the spacer 19 other than the first base portion 32. In the present embodiment, the front-side half of the spacer 19 is the first base portion 32 and the rear-side half thereof is the second base portion 33, but the disclosure is not limited thereto, and a ratio of the first base portion 32 and the second base portion 33 in the spacer 19 may not be halved. The above-described communication holes 31 are provided in the second base portion 33. Further, shapes of the communication holes 31 of the first base portion 32 and the second base portion 33 may be the same or different.

The second base portion 33 is divided into a plurality of portions in the circumferential direction of the rim metal core portion 28. That is, the second base portion 33 includes a plurality of second base members 43 in the circumferential direction of the rim portion 15 (see FIG. 5), that is, in the circumferential direction of the rim metal core portion 28 (see FIG. 1B). In the present embodiment, three second base members 43 are provided, for example. That is, in the present embodiment, the second base portion 33 is divided into the same number of portions as those in the first base portion 32, but the numbers may not be the same. In the present embodiment, the second base members 43 include a second base member 43a, a second base member 43b, and a second base member 43c.

In the present embodiment, the second base members 43a to 43c are, for example, set to have lengths equal to each other (including substantially equal lengths) in the circumferential direction, but may have lengths different from each other. For example, in the present embodiment, the second base member 43a constitutes, for example, an upper portion on the rear side of the spacer 19 (a portion extending from 10:30 to 1:30 on an analog timepiece when viewed from the rear side). The second base member 43b constitutes a lower right portion on the rear side of the spacer 19 (a portion extending from 1:30 to 6 o'clock on an analog timepiece when viewed from the rear side). The second base member 43c constitutes a lower left portion on the rear side of the spacer 19 (a portion extending from 6 o'clock to 10:30 on an analog timepiece when viewed from the rear side). Accordingly, the second base member 43a covers a portion of the rim metal core portion 28 on an upper side of the spoke metal core portions 27 and 27, and the second base members 43b and 43c respectively cover portions of the rim metal core portion 28 extending from a lower side of the spoke metal core portions 27 and 27 to an upper side of the spoke metal core portions 27 and 27. In addition, the second base members 43b and 43c are disposed to be bilaterally symmetric (including substantially bilaterally symmetric).

In this manner, the first base portion 32 and the second base portion 33 are each divided into a plurality of portions at positions different from each other. In other words, the respective end portions of the first base members 42a to 42c and the respective end portions of the second base members 43a to 43c are disposed at positions different from each other. In the present embodiment, a dividing position of the first base members 42a and 42c is positioned between opposite end portions in a longitudinal direction of the second base member 43a, for example, at a central portion (including a substantially central portion) of the second base member 43a. In addition, a dividing position of the first base members 42a and 42b is positioned between opposite end portions of the second base member 43b, for example, at a central portion (including a substantially central portion) of the second base member 43b. Further, a dividing position of the first base members 42b and 42c is positioned between opposite end portions of the second base member 43c, for example, at a central portion (including a substantially central portion) of the second base member 43c. That is, positions of opposite end portions of each of the plurality of first base members 42 of the first base portion 32 and positions of opposite end portions of each of the plurality of second base members 43 of the second base portion 33 are staggered in the circumferential direction of the rim metal core portion 28. In other words, in the present embodiment, dividing positions of the plurality of first base members 42 of the first base portion 32 and dividing positions of the plurality of second base members 43 of the second base portion 33 are alternately disposed every 60° in the circumferential direction of the rim metal core portion 28.

Figure 2:
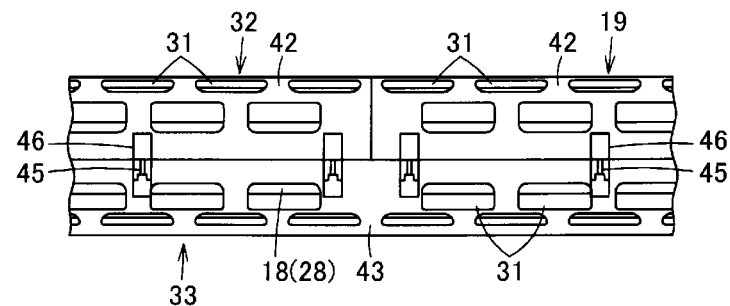
FIG. 2 is a view taken in a direction of arrow X in FIG. 3.
Figure 3:
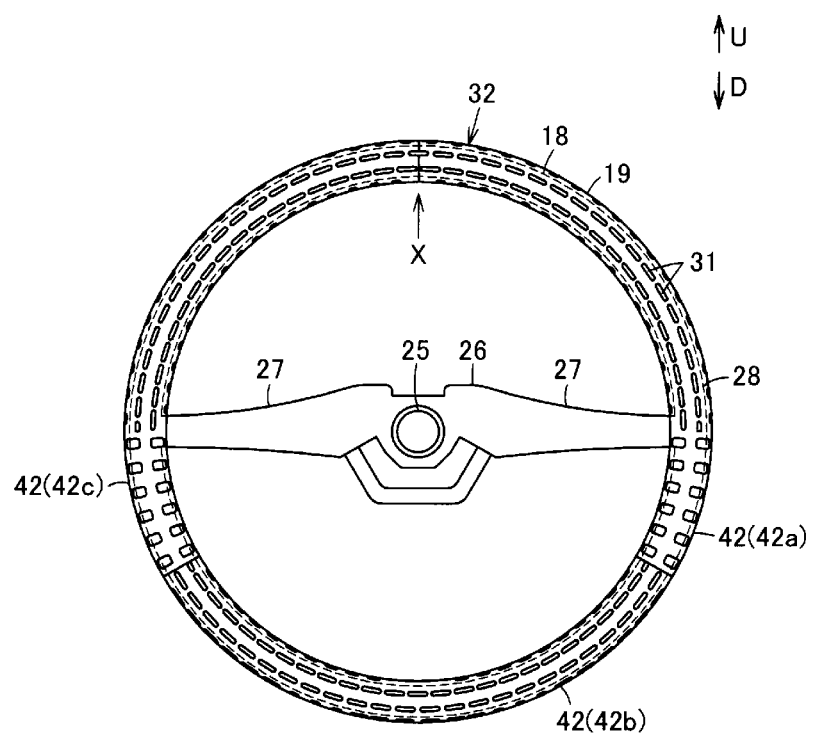
FIG. 3 is a front view illustrating a portion of the steering wheel.

Thus, the first base portion 32 (the first base member 42) and the second base portion 33 (the second base member 43) are engaged with each other with the rim metal core portion 28 interposed therebetween and are fixed by engaging claws 45 and receiving portions 46 (see FIG. 2). The engaging claws 45 are provided at least at one side of the first base portion 32 and the second base portion 33, and the receiving portions 46 are provided at the other side. In the present embodiment, the engaging claws 45 are provided in the second base portion 33 (the second base member 43), and the receiving portions 46 are provided in the first base portion 32 (the first base member 42). In at least one side of the first base portion 32 (the first base member 42) and the second base portion 33 (the second base member 43), the engaging claws 45 are disposed at least at either one of an inner circumferential side and an outer circumferential side of the spacer 19 facing the other side. The receiving portions 46 are disposed at positions corresponding to the engaging claws 45 provided in this manner. For example, a plurality of engaging claws 45 and receiving portions 46 are provided for each first base member 42 or for each second base member 43.

Figure 4A:
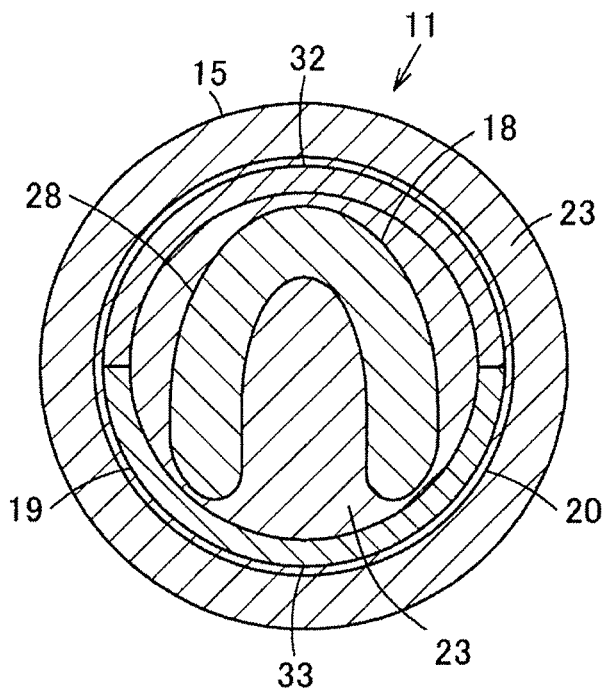
FIG. 4A is a cross-sectional view of a grip portion of the steering wheel.
Figure 4B:
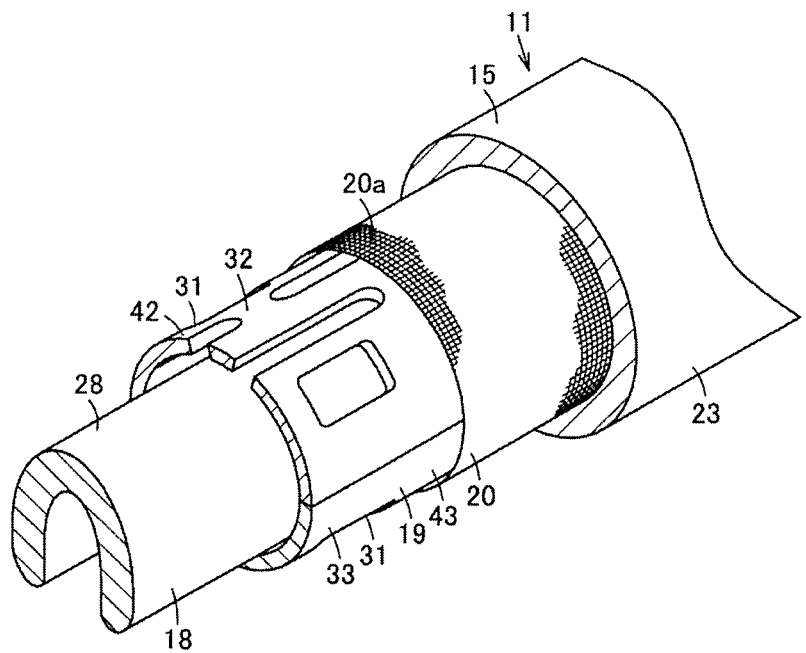
FIG. 4B is a perspective cross-sectional view of the grip portion of the steering wheel.

The electronic component 20 adjusts a temperature of the rim portion 15, for example. Specifically, in the present embodiment, the electronic component 20 is configured, for example, with a sheet member including a heating wire that generates heat when power is supplied, a heater wire that generates heat when power is supplied, a sensor member that detects a temperature of the rim portion 15, or the like (not illustrated). The electronic component 20 may be a sensor (a pressure sensor, a capacitance sensor, or the like) for confirming that the rim portion 15 is gripped by the occupant. The electronic component 20 is formed, for example, as a sheet shaped porous material. For example, the sheet member constituting the electronic component 20 can be formed of a non-woven fabric, a mesh, or the like. In this case, numerous holes 20a are provided in the electronic component 20 (see FIG. 4B). The electronic component 20 is connected to a control circuit (not illustrated), detects a temperature of the rim portion 15 by being supplied with power by the control circuit, and is configured to generate heat in accordance with the temperature. Further, the electronic component 20 is wound around an outer side of the spacer 19, that is, an outer circumferential surface, and is provided to cover the entire spacer 19.

The resin layer 23 is provided to cover the entire rim metal core portion 28 and a portion of the spoke metal core portion 27. Therefore, the resin layer 23 has a substantially circular cross section and is formed in an annular shape when viewed from the front side. More specifically, at a position of the rim portion 15, the resin layer 23 is provided to integrally cover the rim metal core portion 28, the spacer 19, and the electronic component 20. In addition, at a position of the spoke portion 17, the resin layer 23 is provided to cover a region of a predetermined distance from an end portion of the spoke metal core portion 27 at which the spoke metal core portion 27 is continuous with the rim metal core portion 28. That is, a space between the rim metal core portion 28 and the spacer 19 and a space between the spacer 19 and the electronic component 20 are both filled with the resin layer 23. In other words, at least a portion of the rim metal core portion 28, the spacer 19, and the electronic component 20 is buried in the resin layer 23 (see FIG. 4A). Note that the resin layer 23 between the rim metal core portion 28 and the spacer 19 is not illustrated in FIG.

4B. Further, in the present embodiment, the resin layer 23 is formed by finely foaming a soft foamed polyurethane resin, for example. Then, the resin layer 23 is molded using a forming die (mold) (not illustrated).

Although not illustrated, the forming die has one half mold and another half mold. The resin layer 23 is formed by filling a cavity formed between the one half mold and the other half mold with a synthetic resin raw material.

Although not illustrated, the airbag device 12 illustrated in FIG. 5 includes a bag-shaped airbag, a resin-made cover body covering the folded airbag, an inflator for injecting gas, and the like. The cover body is also called a rear cover, a lower portion cover, or a body cover, formed of a synthetic resin or the like, and covers a lower side portion of the boss portion 16. At the time of collision of the automobile or the like, the airbag device 12 rapidly injects gas from the inflator into the interior of the airbag, rapidly inflates the airbag stored in a folded state, cleaves the cover body to inflate and deploy the airbag device 12, and thereby the occupant is protected. Further, a horn switch mechanism or the like may be integrally incorporated in the airbag device 12 as a switch device.

Next, a method of manufacturing the steering wheel 10 having the above-described configuration will be described. First, a first intermediate body (not illustrated) is formed by covering the outer circumference of the rim metal core portion 28 of the metal core 18 integrated with the boss plate 26 or the like in advance with the spacer 19 (see FIG. 3). The spacer 19 is constituted by interposing the rim metal core portion 28 between the first base members 42a to 42c from the front side and the second base members 43a to 43c from the rear side. The first base members 42 and the second base members 43 are fixed by engaging the engaging claws 45 with the receiving portions 46. At this time, since opposite end portions of each of the first base members 42a to 42c are engaged at positions between opposite end portions of the second base members 43a to 43c, and opposite end portions of each of the second base members 43a to 43c are engaged at positions between opposite end portions of the first base members 42a to 42c, positions of the first base portion 32 constituted by the first base members 42 and the second base portion 33 constituted by the second base members 43 are restricted, and a positional deviation and rattling thereof are suppressed.

Next, after the first intermediate body is set in a forming die (not illustrated), a synthetic resin raw material mixed by agitation is injected into a cavity formed by die matching of the one half mold and the other half mold. As a result, the synthetic resin raw material is impregnated in the holes 20a of the electronic component 20, further passes through the communication holes 31 of the spacer 19, enters the inside of the spacer 19 from the outside, and flows toward a flow end while reacting with foaming to become polyurethane.

Thereby, a second intermediate body in which the rim metal core portion 28, the spacer 19, and the electronic component 20 are integrally covered by the resin layer 23 is formed. When burrs and the like are cut away from the second intermediate body removed from the forming die, the steering wheel main body 11 is completed.

Further, the electronic component 20 is electrically connected to the control circuit in the steering wheel main body 11. Then, as illustrated in FIG. 5, when the airbag device 12, the finisher 29, and the like are attached to the steering wheel main body 11, the steering wheel 10 is completed. That is, in the present embodiment, the steering wheel 10 can be formed without winding an epidermal body on the surface of the rim portion 15 and without requiring a plurality of molding steps.

As described above, the steering wheel 10 according to the embodiment of the disclosure includes the spacer 19 having the first base portion 32 and the second base portion 33 which are respectively disposed on the front side and the rear side with the rim metal core portion 28 interposed therebetween and engaged with each other to cover the rim metal core portion 28, in which the first base portion 32 and the second base portion 33 are each divided into a plurality of portions at positions different from each other in the circumferential direction of the rim metal core portion 28. With such a configuration, positions of the first base members 42 divided from the first base portion 32 can be restricted by the second base members 43 divided from the second base portion 33, and positions of the second base members 43 can be restricted by the first base members 42. Thereby, positioning of the first base portion 32 and the second base portion 33 of the spacer 19 can be appropriately performed. Thus, a positional deviation and rattling of the first base portion 32 and the second base portion 33 are appropriately suppressed.

Further, the steering wheel 10 according to the embodiment of the disclosure includes the resin layer 23 covering the rim metal core portion 28 and the spacer 19. Thereby, positioning of the spacer 19 inside the forming die at the time of molding the resin layer 23 can be appropriately performed, a positional deviation and rattling of the first base portion 32 and the second base portion 33 can be suppressed, and a thickness of the resin layer 23 after molding can be made constant.

Further, by attaching the electronic component 20 to the spacer 19, the electronic component 20 can be easily disposed in the rim portion 15 and the electronic component 20 can be precisely positioned.

In the one embodiment described above, the first base portion 32 and the second base portion 33 may be respectively divided into two or four or more first base members 42 and second base members 43.

Further, the rim portion 15 (the rim metal core portion 28) may be formed along a circular arc, and may not be annular.

In addition, the steering wheel 10 is not limited to the configuration having three spoke portions 17, and can be configured to have two or four or more spoke portions 17.

Further, the steering wheel 10 can be used not only for a vehicle such as an automobile, but also as a steering device for an arbitrary transportation.

Instead of the airbag device 12, for example, a pad body in which an impact absorber is stored or the like may be used.

The disclosure can be appropriately used for a steering wheel of an automobile such as an electric vehicle, for example.

It will be apparent to those skilled in the art that various modifications and variations can be made to the disclosed embodiments without departing from the scope or spirit of the disclosure. In view of the foregoing, it is intended that the disclosure cover modifications and variations provided that they fall within the scope of the following claims and their equivalents.

What is claimed is:

1. A steering wheel, comprising:
   a grip portion;
   a grip portion metal core; and
   a base portion including a first base portion and a second base portion which are engaged with each other with the grip portion metal core interposed therebetween and are fixed with each other while covering the grip portion metal core, wherein the first base portion and the second base portion are each divided into a plurality of portions at positions different from each other in a circumferential direction of the grip portion metal core.

2. The steering wheel according to claim 1, further comprising:

a resin layer which covers the grip portion metal core and the base portion, and constitutes at least a portion of the grip portion.

3. The steering wheel according to claim 1, further comprising:

an electronic component attached to the base portion.

\* \* \* \* \*